US010220288B1

(12) United States Patent
Anand et al.

(10) Patent No.: US 10,220,288 B1
(45) Date of Patent: Mar. 5, 2019

(54) TENNIS EQUIPMENT AND ACCESSORY STAND

(71) Applicants: Rahul Anand, Easton, CT (US);
Kieran Anand, Easton, CT (US);
Rhiya Anand, Easton, CT (US)

(72) Inventors: Rahul Anand, Easton, CT (US);
Kieran Anand, Easton, CT (US);
Rhiya Anand, Easton, CT (US)

( * ) Notice: Subject to any disclaimer, the term of this patent is extended or adjusted under 35 U.S.C. 154(b) by 0 days.

(21) Appl. No.: 15/724,778

(22) Filed: Oct. 4, 2017

(51) Int. Cl.
*A63B 71/00* (2006.01)
*F16M 11/24* (2006.01)
*A63B 47/00* (2006.01)
*A63B 102/02* (2015.01)

(52) U.S. Cl.
CPC .......... *A63B 71/0045* (2013.01); *A63B 47/00* (2013.01); *F16M 11/242* (2013.01); *A63B 2102/02* (2015.10); *A63B 2210/50* (2013.01)

(58) Field of Classification Search
CPC . A63B 71/0045; A63B 47/00; A63B 2210/50; A63B 2102/02; F16M 11/242
USPC .................................................. 211/14, 85.7
See application file for complete search history.

(56) References Cited

U.S. PATENT DOCUMENTS

| 187,259 | A | * | 2/1877 | Erlebach | ............ | A63B 71/0045 |
| | | | | | | 211/85.7 |
| 391,608 | A | * | 10/1888 | Hartwell | ................ | A47B 97/08 |
| | | | | | | 248/449 |
| D21,044 | S | * | 9/1891 | Peters | .................. | 47/39 |
| 813,227 | A | * | 2/1906 | Miller | .................. | A47B 23/042 |
| | | | | | | 248/451 |
| 2,088,980 | A | | 8/1937 | Stein | | |
| D175,296 | S | * | 8/1955 | Chrzan | .......................... | D6/311 |
| 2,723,817 | A | * | 11/1955 | Harwood | ............ | G09F 15/0087 |
| | | | | | | 211/182 |
| 3,201,080 | A | * | 8/1965 | Rose | ..................... | F16M 11/36 |
| | | | | | | 248/156 |
| 5,368,351 | A | | 11/1994 | Cuti | | |
| 5,398,665 | A | | 3/1995 | Carlson | | |
| 6,045,108 | A | * | 4/2000 | Cziraky | ................... | A45C 9/00 |
| | | | | | | 248/454 |
| 6,398,040 | B1 | | 6/2002 | Gregory | | |
| D474,617 | S | * | 5/2003 | Swartz | ........................... | D6/310 |
| D646,903 | S | * | 10/2011 | Santana | ......................... | D6/310 |
| D680,122 | S | * | 4/2013 | Yang | .......................... | D14/447 |
| 9,121,541 | B2 | * | 9/2015 | Jones | ..................... | F16M 13/00 |
| 9,220,339 | B1 | | 12/2015 | Chen | | |
| 2008/0026879 | A1 | | 1/2008 | Runck | | |
| 2009/0295108 | A1 | | 12/2009 | Oku | | |
| 2011/0170246 | A1 | * | 7/2011 | Chu | ........................ | F16M 13/00 |
| | | | | | | 361/679.01 |

\* cited by examiner

*Primary Examiner* — Ko H Chan
(74) *Attorney, Agent, or Firm* — Cramer Patent & Design, PLLC; Aaron R. Cramer

(57) ABSTRACT

A stand for tennis balls and a towel provides a portable free-standing tripod-like structure for conveniently positioning such items as tennis balls and a towel upon a tennis court surface during a game of tennis. The stand provides a hinged construction which enables compact folding for storage when not in use.

12 Claims, 3 Drawing Sheets

TENNIS EQUIPMENT AND ACCESSORY STAND

RELATED APPLICATIONS

Not applicable.

FIELD OF THE INVENTION

The present invention relates generally to the field of sporting equipment stands and more specifically to a deployable stand for tennis equipment and accessories.

BACKGROUND OF THE INVENTION

When playing any sport, there is often times the desire and necessity to carry equipment to and from the field or court of play. This equipment is typically bulky, cumbersome, or too numerous to haul to the desired location in a single trip. It is also sometimes a necessity to keep such equipment handy at times when it is needed at any given moment during play or rest. It is particularly so when such items should be easily obtained during the course of play or practice at a moment's notice, instead of having to locate and haul out more necessary equipment.

It is therefore a benefit to have an equipment and accessory holder easy to set up, fold away, carry and transport, and have readily available. This is especially true with the sport of tennis, where tennis balls, towels, and other commonly associated items are used.

Various attempts have been made to solve problems found in tennis equipment and accessory stand art. Among these are found in: U.S. Pat. No. 2,088,980 in the name of Stein; and U.S. Pat. No. 5,368,351 in the name of Cuti. These prior art references are representative of tennis equipment and accessory stands.

When it comes to the sport of tennis, many pieces of commonly used accessories and equipment should be at the ready so as to not have a lot of downtime during the play of the sport during competition of practice. Repetition and availability are features that an apparatus should possess when used in the sport of tennis. Towels, shelving unit to hold personal items or equipment such as talcum powder, as well as providing a way to hold at least a few tennis balls to quickly grab and use when needed is also a desire. The ability to fold away and store on the court in a corner or by a bench and to deploy open quickly is also a great benefit.

None of the above inventions and patents, taken either singly or in combination, is seen to describe the invention as claimed. Thus, a need exists for a reliable, deployable, and resilient tennis equipment and accessory stand art, and to avoid the above-mentioned problems.

SUMMARY OF THE INVENTION

The inventor has recognized the aforementioned, inherent problems and lack in the art and observed that there is a need for a stand to support tennis equipment and associated accessories. Such as stand can include a front leg assembly hingedly attached to a rear leg. The front leg assembly has a first front leg and a second front leg attached to each other by a cross-member. The cross-member has a first offset portion located at an upper first side and another first offset portion located at an upper second side. The rear leg has a second offset portion hingedly attached between the pair of first offset portions, such that the rear leg assembly hingeldy pivots relative to the front leg assembly. The first front leg has a first front foot extending forwardly away from a lower side. Similarly, the second front leg has a second front foot extending forwardly away from a lower side and the rear leg has a rear foot extending rearwardly away from a lower side. Each of the first front foot, second front foot, and rear foot has a concave depression on an upper surface to help retain a tennis ball therein.

In an embodiment, the disclosed device includes a hook located on a front-facing surface of the cross-member, capable of retaining a towel.

In another embodiment, the first front leg and second front leg extending away from each other based on a vertical axial centerline bisecting the front leg assembly.

In another embodiment, each of the first front leg, second front leg, and rear leg tapers in width. The upper portions of each have a smaller width than the lower portions of each, which have a larger width. In certain embodiments where this is the case, the larger width is coextensive with the width of the respective foot.

It is a further object to provide an attachment that is capable of attaching to the front leg assembly when it is deployed. Such an attachment has a rear panel with a first slot and a second slot located on the rear surface and extending to the front and bottom edges. The slots are oriented in such a way to capture a portion of a length of the first front leg and second front leg when the stand is deployed at a given angle. A shelf having a storage compartment is affixed to a front surface of the rear panel.

Furthermore, the features and advantages described herein may be combined in various manners and embodiments as one skilled in the relevant art will recognize. The embodiment and examples disclosed herein can be practiced without one (1) or more of the features and advantages described in a particular embodiment or example.

Further advantages of the embodiments and examples disclosed herein will become apparent from a consideration of the drawings and ensuing description.

BRIEF DESCRIPTION OF THE DRAWINGS

The advantages and features of the embodiments and examples disclosed herein will become better understood with reference to the following more detailed description and claims taken in conjunction with the accompanying drawings, in which like elements are identified with like symbols, and in which:

DESCRIPTIVE KEY

Figure 1:
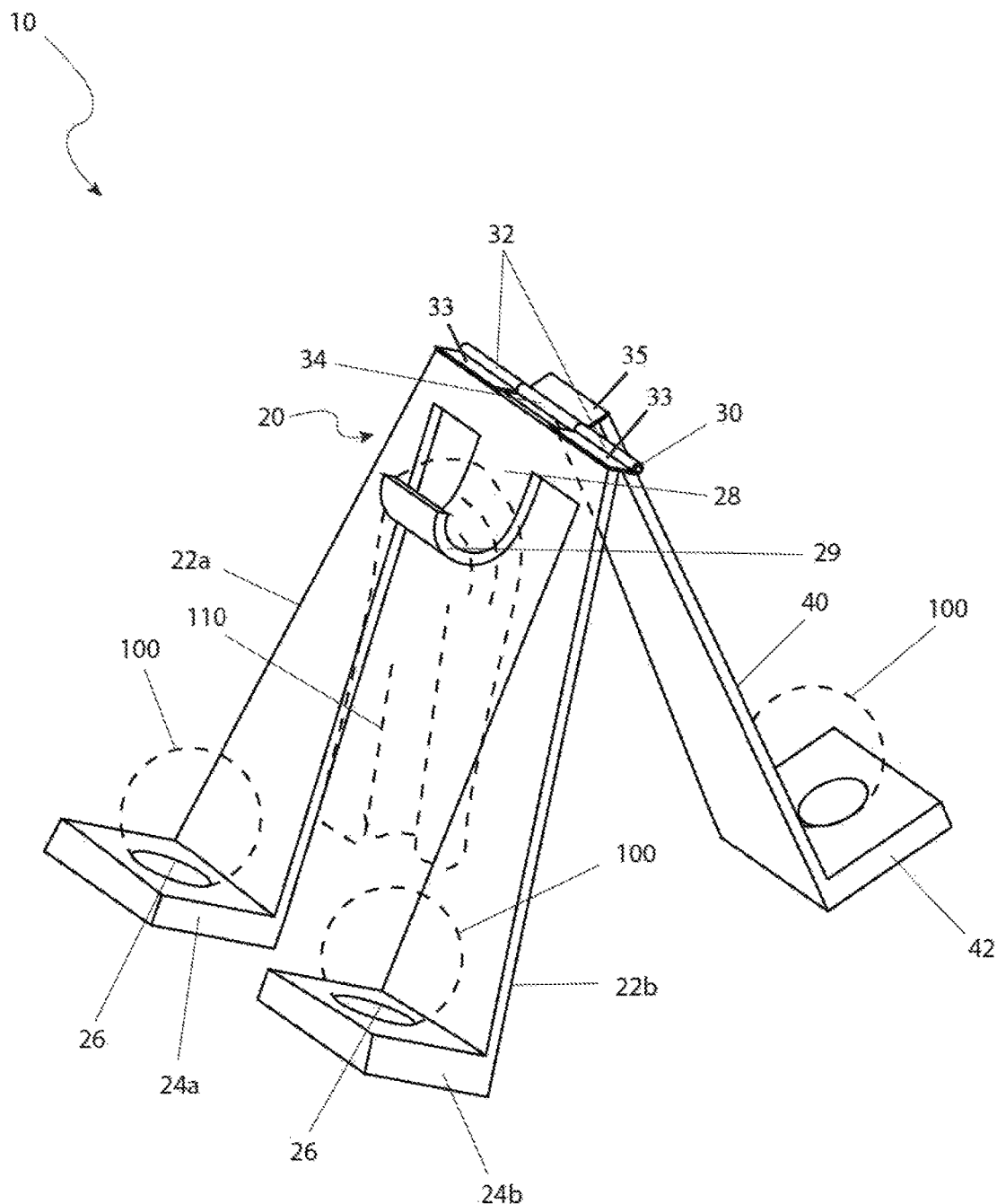
FIG. 1 is a perspective view of a stand for tennis balls and towel 10 depicting an in-use state, in accordance with the preferred embodiment of the present invention.

10 stand for tennis balls and towel
20 front leg assembly
22*a* first front leg
22*b* second front leg
24*a* first front foot
24*b* second front foot
26 depression
28 cross-member 29 hook
30 hinge
32 first hinge element
33 first offset portion
34 second hinge element
35 second offset portion
40 rear leg
42 rear foot
50 accessory tray assembly
51 storage compartment
52 shelf
54 back panel
56a first attachment slot
56b second attachment slot
100 tennis ball
110 towel

DETAILED DESCRIPTION OF THE PREFERRED EMBODIMENT

Figure 2:
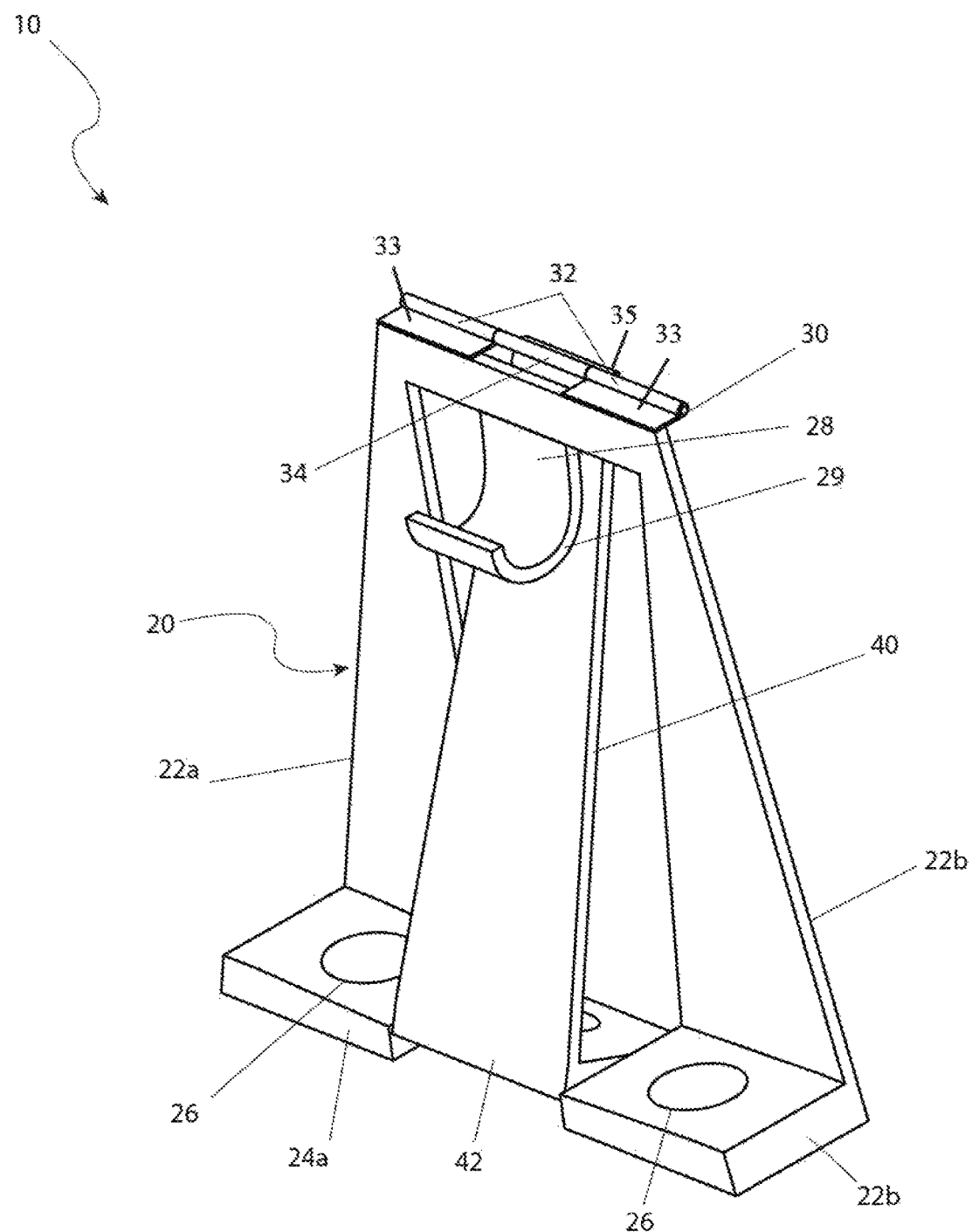
FIG. 2 is another perspective view of the stand for tennis balls and towel 10 depicting a folded state, in accordance with the preferred embodiment of the present invention; and, FIG. 3 is yet another perspective view of the stand for tennis balls and towel 10 depicting attachment of an accessory tray assembly 50, according to an alternate embodiment of the present invention.
Figure 3:
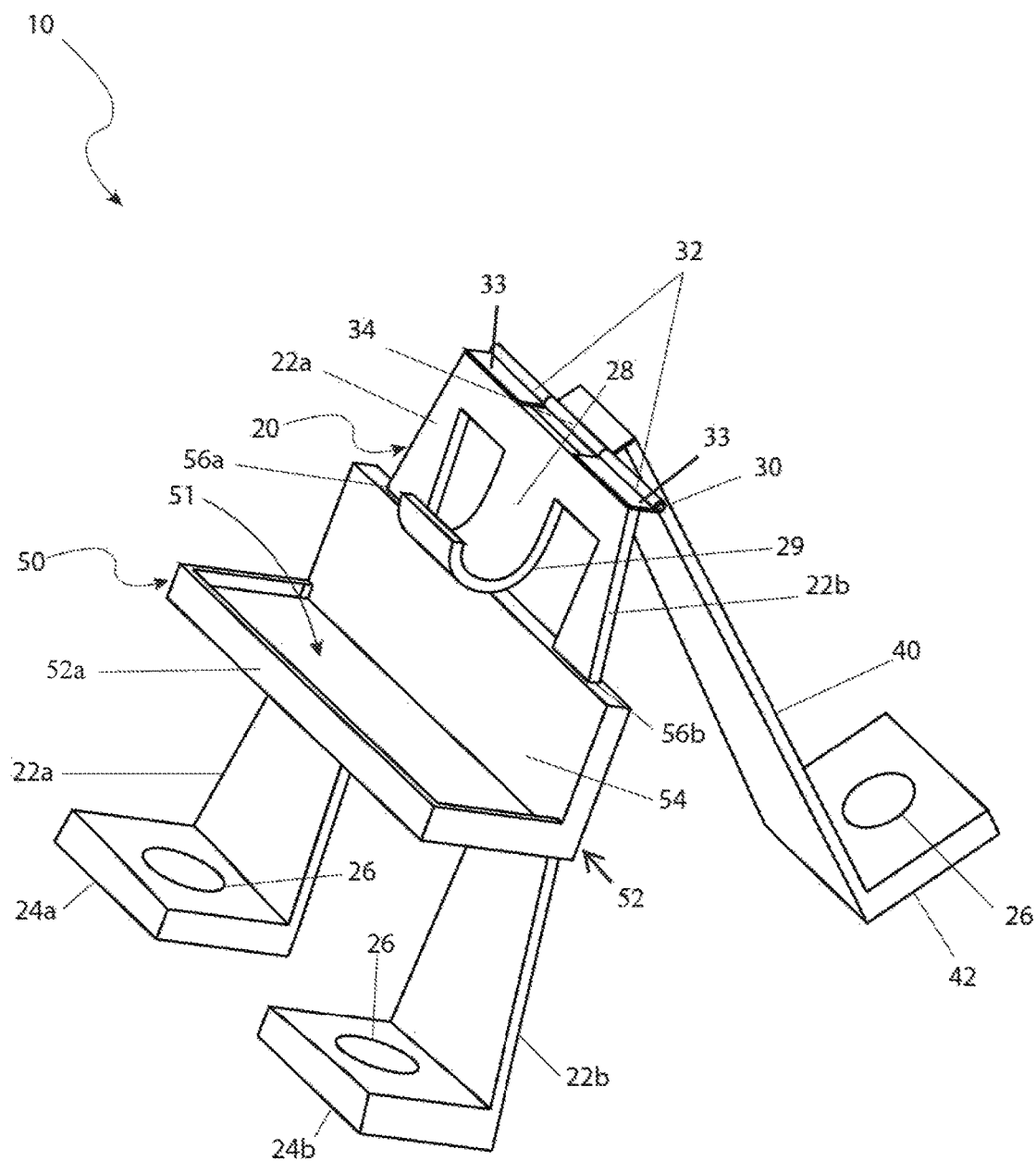

The best mode for carrying out the invention is presented in terms of its preferred embodiment, herein depicted within FIGS. 1 and 2, and in terms of an alternate embodiment, herein depicted within FIG. 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a stand for tennis balls and towel (herein described as the "apparatus") 10, which provides a portable free-standing structure which positions and supplies such items as a plurality of tennis balls 100 and a towel 110 for use by a player during the playing of a game of tennis. The apparatus 10 provides a hinged construction which enables compact folding of the apparatus 10 for convenient storage when not in use.

Referring now to FIGS. 1 and 2, perspective views of the apparatus 10 depicting in-use and folded states, in accordance with the preferred embodiment of the present invention, are disclosed. The apparatus 10 provides a folding portable structure preferably made using a plastic injection-molding process. The apparatus 10 provides a tripod-like form having three (3) leg portions 22a, 22b, 40. The apparatus 10 is envisioned to be approximately eighteen inches (18 in.) in height, and having a triangular footprint being approximately twelve inches (12 in.) between each leg 22a, 22b, 40. However, it is envisioned that the apparatus 10 would be provided for purchase having various height and footprint sizes based upon a user's preferences, and as such should not be interpreted as a limiting factor of the apparatus 10. The apparatus 10 includes a planar front leg assembly 20 having a first front leg 22a, a second front leg 22b, and an interconnecting cross-member 28. The legs 22a, 22b, 40 preferably have a rectangular cross-sectional shape. The cross-member 28 is integral to and acts to join the upper portions of the front legs 22a, 22b, thereby forming a planar structure. The front legs 22a, 22b are arranged in a downwardly divergent manner from each other.

A hinge 30 along a top edge of the apparatus 10 provides pivoting motioning of the front leg assembly 20 with respect to the rear leg 40. The hinge 30 is preferably a piano-style hinge. The outer distal ends of the hinge 30, defined as the first hinge elements 32, are integral with the cross-member 28, first front leg 22a and second front leg 22b. The center portion of the hinge 30, defined as the second hinge element 34, and that what pivots relative to the first hinge elements 32 of the hinge 30, is integral with the rear leg 40. Each of the first hinge elements 32 has a first offset portion 33 directed forwardly (i.e, towards the front leg assembly 20). Similarly, the second hinge element 34 has a second offset portion 35 directed rearwardly (i.e, towards the rear leg 40). During use, a user-selectable inclusive angle between the front legs 22a, 22b and rear leg 40 may be obtained, envisioned to be approximately forty-five to sixty degrees (45°-60°), and would be selected by a user so as to obtain stable positioning of the apparatus 10 upon a tennis court surface. The hinge 30 also enables compact folding of the apparatus 10 by allowing the rear leg 40 to pivot in a forward direction until being aligned adjacently with, and having at least a portion positioned between the front legs 22a, 22b. This arrangement allows for compact folding and storage of the apparatus 10 when not in use.

The legs 22a, 22b, 40 are of an "L"-shaped form, having respective perpendicularly extending horizontal first foot 24a, second foot 24b, and rear foot 42 portions. In a preferred embodiment, the feet 24a, 24b, 42 are integral with the respective leg 22a, 22b, 40. Each of the legs 21, 22b, 40 taper in width from a smaller upper width (integral with the respective offset portion 33, 35) to a larger width at the terminal ends thereof. At the terminal ends is a respective foot 24a, 24b, 42. Each foot portion 24a, 24b, 42 in turn includes a molded concave depression 26 along a top surface, being suitable in size and shape to position and retain a tennis ball 100 within. Each foot 24a, 24b, 42 is envisioned to be of a sufficient thickness and weight so as to act to stabilize the apparatus 10 upon the tennis court surface. The first front foot 24a extends forwardly from the first front leg 22a and similarly the second front foot 24b extends forwardly from the second front leg 22b. The rear foot 42 extends rearwardly from the rear leg 40. This is to ensure that the tennis balls 100 retained within the concave depressions 26 do not roll off of any of the feet 24a, 24b, 42. In a preferred embodiment, each of the legs 22a, 22b, 40 acts as a rear wall to the respective foot 24a, 24b, 42. In order to accomplish this, it is preferred that maximally, the width of each leg 22a, 22b, 40 at the terminal ends are coextensive with the width of the respective foot 24a, 24b, 42. Other widths of the legs 22a, 22b, 40 relative to the respective foot 24a, 24b, 42 can be provided, such that the tennis ball 100 is retained within the concave depressions 26.

Additionally, the cross-member portion 28 of the apparatus 10 includes an integrally-molded planar "J"-shaped hook 29 being of sufficient size so as to support and suspend a user's towel 110, or similar item, for quick retrieval when needed, as well as to promote drying of the towel 110.

It is envisioned that the apparatus 10 would be provided for purchase being molded in various attractive colors and patterns based upon a user's preferences, and as such should not be interpreted as a limiting factor of the apparatus 10.

Referring now to FIG. 3, a perspective view of the apparatus 10 depicting attachment of an accessory tray portion 50, according to an alternate embodiment of the present invention, is disclosed. An alternate embodiment of the apparatus 10 is shown here having an accessory tray assembly 50 being removably attached to the front leg portions 22a, 22b of the previously described apparatus 10. The accessory tray assembly 50 provides a user with a removably attached shelf 52 having an integral recessed storage compartment 51 into which personal items such as a phone, food/drink items, a score pad, and the like, may be located for use during play.

The embodiment of the accessory tray assembly 50 shown here provides a unitary integrally-molded "L"-shaped form envisioned to be made using similar materials as the apparatus 10. The accessory tray assembly 50 includes a forwardly extending shelf portion 52a and a vertical back panel portion 54. Furthermore, the back-panel portion 54 includes opposing integral first attachment slot 56a and second attachment slot 56b portions. The attachment slots 56a, 56b are to be of a rectangular shape, similar in size and shape to that of the respective adjacent front legs 22a, 22b. The attachment slots 56a, 56b are to preferably "snap" onto the front legs 22a, 22b in a stable manner via a friction or interference fit. This is accomplished when the apparatus 10 is at a deployed angle that permits the orientation of the first attachment slot 56a to align with the orientation of a portion of the length of the first front leg 22a and similarly, that which permits the orientation of the second attachment slot 56b to align with the orientation of a portion of the second front leg 22b.

It is envisioned that other styles and configurations of the present invention can be easily incorporated into the teachings of the present invention, and only one (1) particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing and utilizing the apparatus 10 may be achieved by performing the following steps: procuring a model of the apparatus 10 having a desired size and external appearance; transporting the apparatus 10 to a tennis court; selecting a position for the apparatus 10 upon a tennis court surface convenient to a user; separating the front legs 22a, 22b from the rear leg 40 about the hinge 30; selecting a stabilizing inclusive angle between the front legs 22a, 22b and rear 40 of approximately forty-five to sixty degrees (45°-60°); placing the apparatus 10 upon the tennis court surface; placing a desired number of tennis balls 100 upon the depression portions 26 of the feet 24a, 24b, 42; hanging a user's towel 110, or similar item, upon the hook 29 for quick retrieval and/or to aid in drying the towel 110; utilizing the apparatus 10 during the playing of a tennis match by retrieving tennis balls 100 as needed during service, and using the towel 110 as needed between points; and, benefiting from the convenient positioning and availability of tennis balls 100 and a towel 110, afforded a user of the present invention 10.

The method of installing and utilizing the alternate accessory tray assembly 50 may be achieved by performing the following steps: attaching the accessory tray assembly 50 to the apparatus 10 by "snapping" the attachment slot portions 56a, 56b of the accessory tray assembly 50 onto the front leg portions 22a, 22b; loading desired items such as a phone, food/drink items, a score pad, and the like, into the recessed storage compartment portion 51 of the accessory tray assembly 50; and, benefiting from the availability of additional personal items afforded a user of the alternate accessory tray assembly 50, in conjunction with the apparatus 10.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

The invention claimed is:

1. A stand, comprising:
    a front leg assembly, comprising:
        a first front leg;
        a second front leg;
        a cross-member having an upper end and a lower end, said cross-member conjoining said first front leg to said second front leg, said cross-member includes an integrally-molded "J"-shaped planar hook to support and suspend a user's towel, or similar item, for quick retrieval when needed, as well as to promote drying of said towel or said similar item;
        a first front foot extending forwardly away from said first front leg;
        a second front foot extending forwardly away from said second front leg; and
        a rear leg assembly having an upper end hingedly attached to said cross-member upper end, comprising a rear foot extending rearwardly away from a rear leg, wherein each said first front foot, said second front foot, and said rear foot includes a molded concave depression along a top surface of said first front foot, said second front foot, and said rear foot respectively to position and retain a tennis ball in each of said concave depressions; and wherein each of said first front foot, said second front foot, and said rear foot stabilizes said stand upon a tennis court surface.

2. The stand of claim 1, wherein:
    said front leg assembly further comprises a pair of first offset portions, said pair of first offset portions each located at a respective first side and a second side of an upper cross-member; and
    said rear leg further comprises a second offset portion located at said rear leg upper end, wherein said second offset portion is hingedly attached between said pair of first offset portions.

3. The stand of claim 1, wherein:
    said first front leg tapers outwardly in width from a first leg upper end to a first leg lower end at said first front foot;
    said second front leg tapers outwardly in width from a second leg upper end to a second leg lower end at said second front foot; and
    said rear leg tapers outwardly width from said rear leg upper end to a rear leg lower end at said rear foot.

4. The stand of claim 3, wherein:
    said first front leg lower end has a first front leg lower end width coextensive with a first foot width of said first front foot;
    said second front leg lower end has a second front leg lower end width coextensive with a second foot width of said second front foot; and
    said rear leg lower end has a rear leg lower end width coextensive with a rear foot width of said rear foot.

5. The stand of claim 3, wherein:

said first front leg diverges away from a vertical axial centerline of said front leg assembly towards a first side thereof; and wherein said second front leg diverges away from said vertical axial centerline of said front leg assembly towards a second side thereof.

6. The stand of claim 5, wherein:

said first front leg lower end has a first front leg lower end width coextensive with a first foot width of said first front foot;

said second front leg lower end has a second front leg lower end width coextensive with a second foot width of said second front foot; and said rear leg lower end has a rear leg lower end width coextensive with a rear foot width of said rear foot.

7. A stand, comprising:

a front leg assembly, comprising:
- a first front leg;
- a second front leg;
- a cross-member having an upper end and a lower end, said cross-member conjoining said first front leg to said second front leg, said cross-member includes an integrally-molded "J"-shaped planar hook to support and suspend a user's towel, or similar item, for quick retrieval when needed, as well as to promote drying of said towel or said similar item;
- a first front foot extending forwardly away from said first front leg; and,
- a second front foot extending forwardly away from said second front leg;

a rear leg assembly having an upper end hingedly attached to said cross-member upper end, comprising a rear foot extending rearwardly away from a rear leg, wherein each said first front foot, said second front foot, and said rear foot includes a molded concave depression along a top surface of said first front foot, said second front foot, and said rear foot respectively to position and retain a tennis ball in each of said concave depressions; and wherein each of said first front foot, said second front foot, and said rear foot stabilizes said stand upon a tennis court surface; and a tray, comprising:
- a rear panel having a rear side comprising first linear slot oriented between a first location of an upper perimeter edge and a first location of a lower perimeter edge and a second linear slot oriented between a second location of said upper perimeter edge and a second location of said lower perimeter edge;

the tray provides a removably attached shelf having an integral recessed storage compartment into which personal items are located for use during play;

wherein said first slot receives at least a portion of said first front leg therein and said second slot receives at least a portion of said second front leg therein when said front leg assembly is deployed at a deployed angle.

8. The stand of claim 7, wherein said front leg assembly further comprises:

a pair of first offset portions, said pair of first offset portions each located at a respective first side and a second side of an upper cross-member; and said rear leg further comprises a second offset portion located at said rear leg upper end;

wherein said second offset portion is hingedly attached between said pair of first offset portions.

9. The stand of claim 7, wherein:

said first front leg tapers outwardly in width from a first front leg upper end to a first front leg lower end at said first front foot;

said second front leg tapers outwardly in width from a second front leg upper end to a second front leg lower end at said second front foot; and said rear leg tapers outwardly width from said rear leg upper end to a rear leg lower end at said rear foot.

10. The stand of claim 9, wherein:

said first front leg lower end has a first front leg lower end width coextensive with a first foot width of said first front foot;

said second front leg lower end has a second front leg lower end width coextensive with a second foot width of said second front foot; and said rear leg lower end has a rear leg lower end width coextensive with a rear foot width of said rear foot.

11. The stand of claim 9, wherein:

said first front leg diverges away from a vertical axial centerline of said front leg assembly towards a first side thereof, wherein said second front leg diverges away from said vertical axial centerline of said front leg assembly towards a second side thereof.

12. The stand of claim 11, wherein:

said first front leg lower end has a first front leg lower end width coextensive with a first foot width of said first front foot;

said second front leg lower end has a second front leg lower end width coextensive with a second foot width of said second front foot; and said rear leg lower end has a rear leg lower end width coextensive with a rear foot width of said rear foot.

\* \* \* \* \*